US008341417B1

(12) United States Patent
McGrew

(10) Patent No.: US 8,341,417 B1
(45) Date of Patent: Dec. 25, 2012

(54) DATA STORAGE USING ENCODED HASH MESSAGE AUTHENTICATION CODE

(75) Inventor: David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 1077 days.

(21) Appl. No.: 11/638,092

(22) Filed: Dec. 12, 2006

(51) Int. Cl.
*G06F 21/00* (2006.01)

(52) U.S. Cl. ........................................ 713/181; 713/193

(58) Field of Classification Search .................. None
See application file for complete search history.

(56) References Cited

U.S. PATENT DOCUMENTS

| 5,748,736 | A * | 5/1998 | Mittra | 713/163 |
|---|---|---|---|---|
| 6,728,378 | B2 * | 4/2004 | Garib | 380/259 |
| 7,752,449 | B1 * | 7/2010 | Chapman | 713/179 |
| 2003/0221109 | A1 * | 11/2003 | Boyer et al. | 713/176 |
| 2004/0005061 | A1 * | 1/2004 | Buer et al. | 380/282 |
| 2004/0185842 | A1 * | 9/2004 | Spaur et al. | 455/420 |
| 2004/0250071 | A1 * | 12/2004 | Higashiura et al. | 713/170 |
| 2005/0086504 | A1 * | 4/2005 | You et al. | 713/193 |
| 2005/0097348 | A1 * | 5/2005 | Jakubowski et al. | 713/200 |
| 2005/0154899 | A1 * | 7/2005 | Marvel et al. | 713/187 |
| 2005/0265349 | A1 * | 12/2005 | Garg et al. | 370/395.2 |
| 2006/0174129 | A1 * | 8/2006 | Brignone et al. | 713/181 |

OTHER PUBLICATIONS

Backes et al., "Lazy Revocation in Cryptographic File Systems," Sep. 2, 2005, pp. 1-16, published by IBM Corporation IBM Zurich Research Laboratory, Rüschlikon, Switzerland.

* cited by examiner

*Primary Examiner* — Gilberto Barron, Jr.
*Assistant Examiner* — Shaun Gregory
(74) *Attorney, Agent, or Firm* — Hickman Palermo Truong Becker Bingham Wong LLP

(57) ABSTRACT

Data storage and message processing using an encoded hash message authentication code is described. In one embodiment, a data processing apparatus comprises one or more processors; logic coupled to the one or more processors for execution and which, when executed by the one or more processors, causes receiving a data set at the one or more processors; creating and storing a hash output value by applying the data set to a collision-resistant hash operation that provides the hash output value as output; encoding the hash output value using a uniquely invertible keyed pseudo-random permutation operation based on a first shared key, to result in creating an encoded authentication code; and associating the encoded authentication code with the data set.

31 Claims, 5 Drawing Sheets

DATA STORAGE USING ENCODED HASH MESSAGE AUTHENTICATION CODE

FIELD OF THE INVENTION

The present disclosure generally relates to secure data storage systems and the use of cryptographic authentication of messages that are stored on, and communicated between, computers and other devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

When data must be stored on a computer that is not trusted, it is often desirable to provide cryptographic authentication of that data using a message authentication code (MAC). For example, when a file server is accessible to a wide group of users, one or more of those users can apply a MAC with a shared secret key to a particular file, and store the MAC tag with the file. The users that also have that same shared secret key then can detect any unauthorized alteration of that file by re-computing the MAC and comparing the re-computed value to a copy of the previously stored MAC tag.

As in any cryptosystem, changing secret keys is sometimes necessary. For example, when multiple users share a secret key, it may be necessary to change a key because one of the users becomes untrusted. If a device containing the key has been stolen or compromised, then a user may no longer be trusted. When a MAC key is changed, the MAC tags for each authenticated data element must be recomputed using the new key. This operation is potentially very costly, because with conventional MAC operations the entire set of authenticated data must be run through a cryptographic function. Using this operation with large data storage systems might require processing gigabytes or terabytes of data using the cryptographic function, which consumes considerable time and processing resources.

An alternative to re-computing the MAC tags is "lazy revocation", which postpones re-computation of a MAC until a user or other computer requests or fetches the associated data.

Lazy revocation is only useful when it is acceptable to make the assumption that all adversaries seeking to break into the system have limited access to the stored data and MAC tags. A lazy revocation technique is described in "Lazy Revocation in Cryptographic File Systems," http://www.zurich.ibm.com/4cca/papers/lazyfs.pdf.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
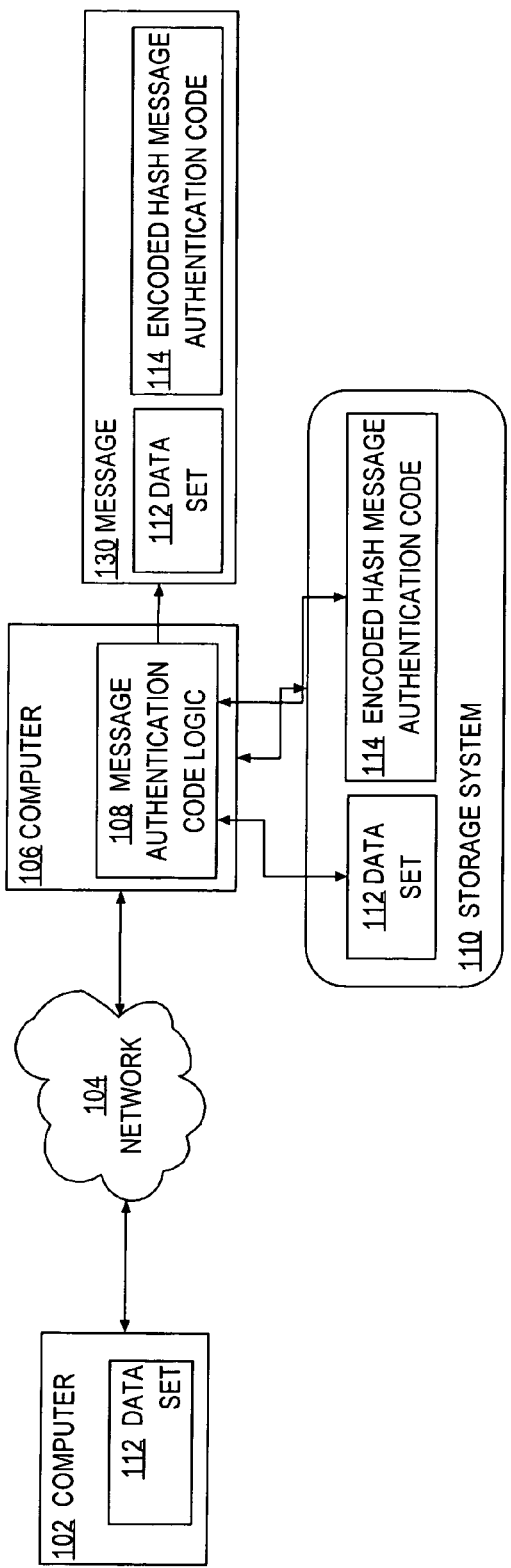
FIG. 1A illustrates a data processing system using encoded hash message authentication codes.

Data storage using an encoded hash message authentication code is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
    3.0 Data Storage Using Encoded Hash MAC
        3.1 Overview
        3.2 Collision-Resistant Hash Function
        3.3 Pseudo-random Permutation
        3.4 Complete Formal Specification of Example Embodiment
        3.5 Security Considerations
    4.0 Implementation Mechanisms—Hardware Overview
    5.0 Extensions and Alternatives
    1.0 General Overview In one embodiment, a data processing apparatus comprises one or more processors; logic coupled to the one or more processors for execution and which, when executed by the one or more processors, causes receiving a data set at the one or more processors; creating and storing a hash output value by applying the data set to a collision-resistant hash operation that provides the hash output value as output; encoding the hash output value using a uniquely invertible keyed pseudo-random permutation operation based on a first shared key, to result in creating an encoded authentication code; and associating the encoded authentication code with the data set.

In one feature, the logic comprises further sequences of instructions which, when executed by the one or more processors, cause the apparatus to perform receiving a second shared key; retrieving and decoding the encoded authentication code using the first key to result in recovering the hash output value; re-encoding the hash output value using the permutation operation based on the second shared key, to result in creating a second encoded authentication code without re-applying the data set to the hash operation; storing the second encoded authentication code in association with the data set.

In one embodiment, the hash operation is a one-way hash function having a fixed-length output. In another embodiment, the hash operation is SHA-1. In yet another embodiment, the permutation operation is AES in a four-round Luby-Rackoff function. In a further embodiment, the encryption operation is a 256-bit width Rijndael cipher. The Extended Codebook (XCB) or the Encrypt-Mask-Encrypt (EME) block cipher modes of operation may be used as alternatives.

In an embodiment, the data set is a message, and the apparatus is any of a router and a switch in a packet-switched network. Associating, in the context herein, may comprise storing the encoded authentication code with the data set, storing information derived from the data set with the encoded authentication code, storing the data set and the encoded authentication code in separate locations, generating and sending a message containing the data set and the encoded authentication code to a networking device or endpoint, or other association operations.

In other embodiments, a data storage system, a method, and a computer-readable medium are provided.

2.0 Structural and Functional Overview

When message authentication codes (MACs) are used to enforce access control on stored data, it is necessary to re-compute the MAC values whenever a key is updated, for example, to revoke the privileges of one or more users. However, when large amounts of stored data are authenticated, the re-computation operation can require an unreasonably long time.

For example, assume that a set of files is authenticated using a symmetric MAC and the authentication tags are stored along with the files. The key used to authenticate the files is given to all the users who have permission to read and/or write the files. If write permission is removed from one user, then the authentication key must be changed. A new key must be chosen and securely communicated to the users with read and/or write permission, the authentication tags for all of the files must be recomputed with the new key, and the old authentication tags must be replaced with the new ones. In modern data storage systems that store very large amounts of data, the problem of computing the new tags becomes acute.

The present disclosure solves the problem of efficient re-keying, by introducing a method for re-computing authentication tags in which the computational cost per tag is constant, independent of the amount of data. According to an embodiment, an encoded hash MAC can be re-keyed with minimal work. The encoded hash MAC is secure even when an adversary can affect the inputs to the re-keying operation.

In an embodiment, the data set is a file stored in a file system. In an alternative embodiment, the data set is stored in a database that an application program manages. In a further alternative, the data set is a message, and the apparatus is any of a router and a switch in a packet-switched network.

Thus, a message authentication code is constructed by applying a reversible encryption function to the hash of the message, where the hash is collision-resistant. The secret key of the encryption function is the secret key of the MAC. As a result, re-keying requires a constant amount of computation per tag, rather than an amount proportional to the length of the authenticated data.

Further, techniques for re-performing MAC generation for a large number of files are provided. A key updating technique is provided that does not require re-computing the MAC over all the data. In an embodiment using a router in a packet-switched network, the MAC can be re-generated hop by hop without re-computing the MAC over all of a large message payload.

The approach herein can be used in a networked data storage system. The approach herein also could be used in security software products that need to secure their own data stores. The approach can be used by a vendor of data storage devices, networked storage, etc.

FIG. 1A illustrates a data storage system using encoded hash message authentication codes. A computer 102 is coupled directly or indirectly through one or more networks 104 to a second computer 106. In an embodiment, second computer 106 is a storage controller that manages a storage system 110. Alternatively, second computer 106 is a networking device such as a router or switch. The computer 102 may comprise any general purpose data processing system such as a personal computer, workstation, server, or other processing system. The computer 102 comprises a data set 112 to be stored in the storage system 110. The data set 112 may comprise one or more messages, data files, records, objects, or other form of information or data.

In one embodiment, network 104 comprises one or more local area networks, storage area networks, wide area networks, internetworks, or any combination thereof. Computer 106 may comprise a storage controller that arbitrates requests to read and write data from or to storage system 110. Storage system 110 may comprise electronic memory, non-volatile storage such as magnetic or optical disk storage, tape storage, or other computer storage, structured as a single drive, multiple drives, and/or one or more shared memory systems. In an embodiment, computer 106 is a SCSI controller and storage system 110 is one or more SCSI drives. In an embodiment, storage system 110 is a RAID disk array. In one embodiment, computer 106 and storage system 110 may be integrated or may comprise a server or storage area network. In another embodiment, the storage controller and/or the storage system may be physically or logically in the computer 102. Thus, FIG. 1A broadly represents many different arrangements of a computer that is coupled to storage.

In one embodiment, computer 106 comprises message authentication logic 108. In an embodiment, the message authentication logic 108 can receive data set 112 from computer 102, and generate a hash message authentication code 114. A property of the hash message authentication code 114 is that re-keying operations and re-computing a new message authentication code do not require applying a hash function to the data set 112 another time. The data set 112 is stored in association with hash message authentication code 114 in storage system 110 under control of computer 106.

In another embodiment, message authentication code logic 108 is implemented in a network infrastructure device, such as a router or switch. In such an embodiment, computer 106 receives the data set 112 in the form of a data frame, segment, packet, or message, the message authentication code logic 108 generates the hash message authentication code, the message authentication code logic stores or packages the hash message authentication code with the data set in a message 130, and the router forwards the message with the data set and the hash message authentication code to a next hop or to an endpoint.

Figure 1B:
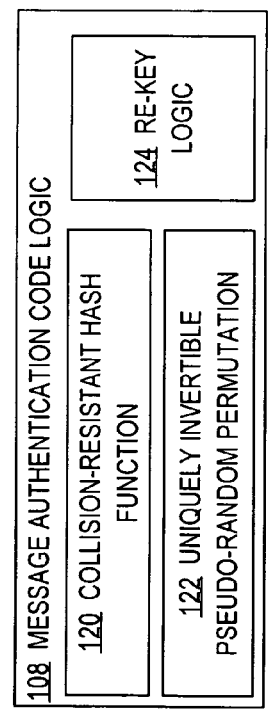
FIG. 1B illustrates logic for generating encoded hash message authentication codes and performing re-keying.

FIG. 1B illustrates logic for generating encoded hash message authentication codes and performing re-keying. In one embodiment, message authentication logic 108 comprises a collision-resistant hash function 120, a uniquely invertible pseudo-random permutation 122, and re-key logic 124. The message authentication logic 108 and its elements may comprise one or more computer programs, methods, or other software elements that implement the processing logic that is described further herein. In other embodiments, message authentication logic 108 may be implemented in firmware or hardware.

Figure 2:
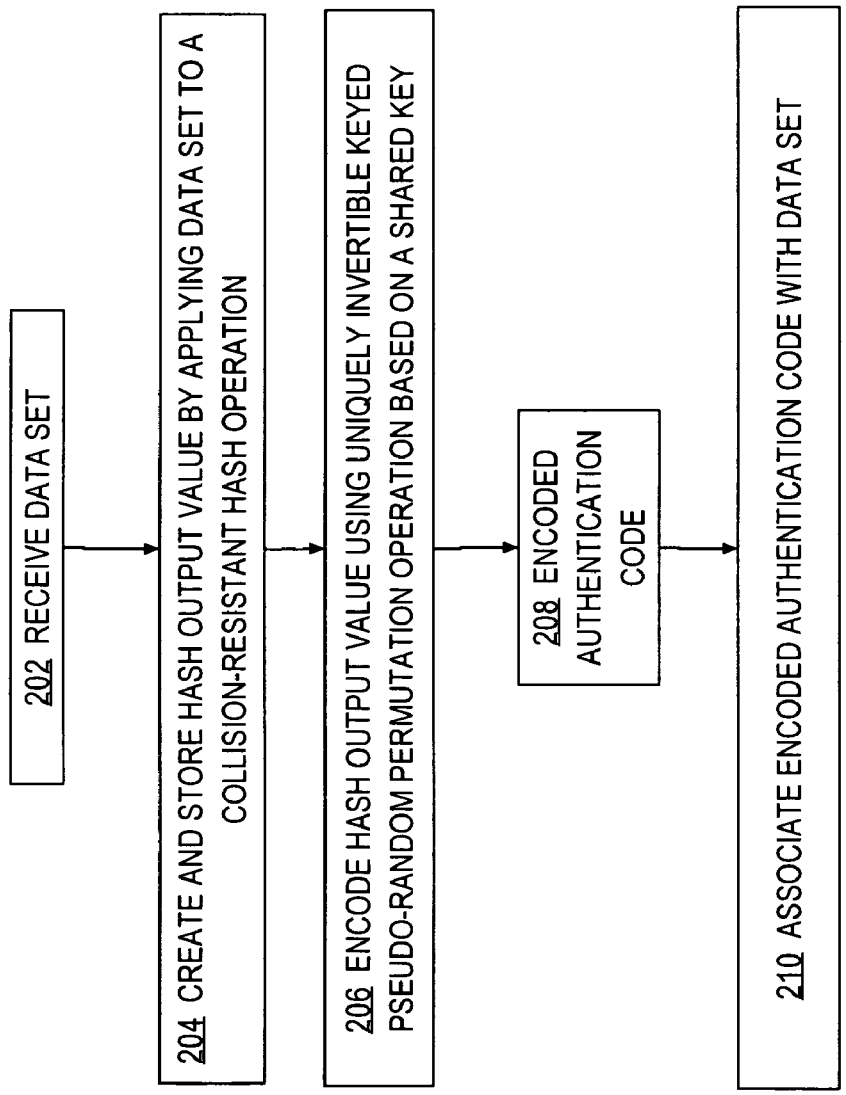
FIG. 2 illustrates generating hash message authentication codes.

FIG. 2 illustrates storing data in a data storage system. In an embodiment, at step 202 a data set is received, and at step 204 a hash output value is created and stored by applying the data set to a collision-resistant hash operation or hash function. In step 206, the hash output value is encoded using a uniquely invertible keyed pseudo-random permutation operation based on a shared key. In this context, "shared" means that the same key is initially used for the hash operation or hash function and the pseudo-random permutation operation. The result of step 206 is an encoded authentication code, as shown in step 208.

In step 210, the encoded authentication code is associated with the data set that was received at step 202. Step 210 may comprise storing authenticated data in a data storage system or forwarding a message containing the data set and encoded authentication code to a networking device or to an endpoint. Step 210 may comprise storing the encoded authentication code separately from the data, though it is often convenient to store the data and encoded authentication code together. Thereafter, the encoded authentication code may be re-generated and compared to the stored encoded authentication code for purposes of determining whether the data set was altered after storage. In such a verification operation, the message authentication logic 108 may retrieve a previously used key from a secure key management system that is coupled or accessible to the message authentication logic.

Step 210 may comprise performing a storage operation in computer storage in a storage system. Alternatively, step 210 comprises forwarding a message with an authentication code to a networking device or to an endpoint. Step 210 may include transiently storing the message and code in main memory, forwarding memory, buffers, and other elements of a router, switch, or other networking device.

A need may arise to change the shared key, and if the shared key is generated, then the stored encoded authentication code may become unintelligible in future verification operations. Therefore, a new encoded authentication code may be created using a new shared key, and stored with the data set to replace the original encoded authentication code. In an embodiment, a re-keying operation may be performed without re-applying the data set to the hash operation of step 204, which is relatively computationally intensive.

Proper validation of a previously generated hash value requires the system to store each key with information about the time during which it was used. Thus, a secure key management system may be provided to store keys. Specific key management techniques are beyond the scope of this disclosure, and any key management technique may be used to securely maintain and provide past keys.

Figure 3:
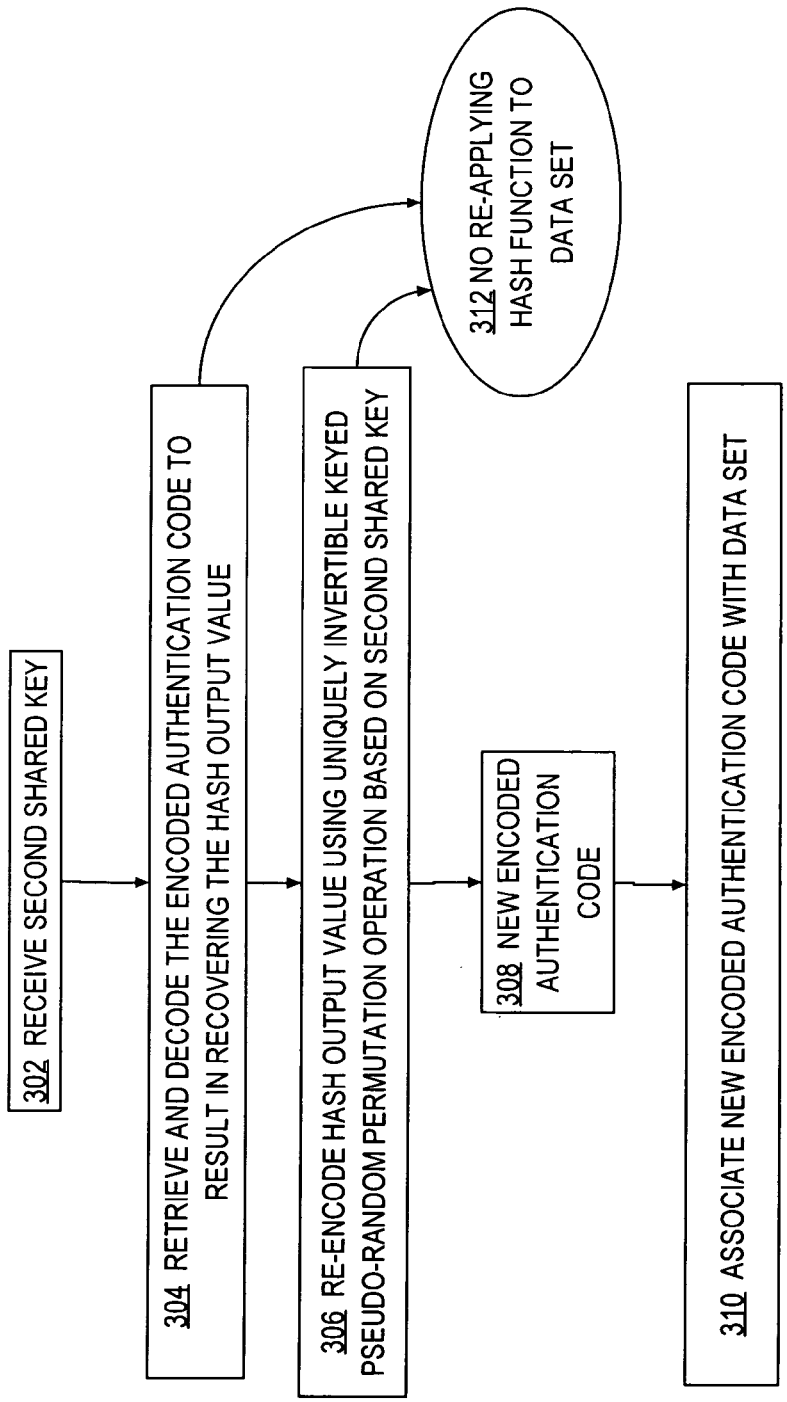
FIG. 3 illustrates re-keying a hash message authentication code.

FIG. 3 illustrates re-keying a code in a data storage system. In step 302, a second shared key is received. The second shared key is a new key or replacement key. Techniques for distributing new keys or replacement keys to the message authentication logic or other elements of FIG. 1 are beyond the scope of this disclosure, and any distribution mechanism may be used.

In step 304, the existing encoded authentication code is retrieved from storage and decoded, resulting in recovering the hash output value of step 204. Techniques for decoding are described further herein.

In step 306, the hash output value is re-encoded using the same pseudo-random permutation operation that was used at step 206, but using the second shared key. As shown in step 312, it is not necessary to re-generate the hash output value, for example, by re-applying the stored data set to the hash function. The property of step 312 has several benefits. For example, using the techniques herein, a large number of MAC values for a large number of stored files, each occupying a large amount of storage, may be re-computed rapidly without hashing the large files. Further, when the data set is a message and the logic is implemented in a network infrastructure device such as a router or switch, a new MAC value may be re-computed "on the fly" without excessive delay during message transmission.

As a result of step 306, a new encoded authentication value is produced. In step 310, the new encoded authentication code is associated with the previously stored data set. Step 310 may comprise performing a storage operation in computer storage in a storage system. Alternatively, step 310 may comprise forwarding a message with an authentication code to a networking device or to an endpoint. Step 310 may include transiently storing the message and code in main memory, forwarding memory, buffers, and other elements of a router, switch, or other networking device.

3.0 Data Storage Using Encoded Hash Mac

3.1 Overview

The Encoded Hash MAC (EHM) disclosed herein is a message authentication code that supports an efficient re-keying operation. In an embodiment, the EHM is mathematically defined as $T=E_K(h(M))$, where $E_K(X)$ denotes the encryption of X with a pseudo-random permutation E using the key K, and h(M) denotes the application of a collision-resistant hash function h to the message M. Further, the function $E:\{0,1\}^k \times \{0,1\}^w \rightarrow \{0,1\}^w$ maps a k-bit key and a w-bit string to a w-bit string. The function E is uniquely invertible, and its inverse is denoted as $E_K^{-1}$. Therefore, $E_K(E_K^{-1}(X))=X$ for all $X \in \{0,1\}^w$.

In an embodiment, E is selected as indistinguishable from a random permutation to a computationally limited adversary. In an embodiment, E may comprise an implementation of a block cipher such as the Advanced Encryption Standard, or a block cipher mode of operation that implements a permutation.

In an embodiment, a function h: $\{0,1\}^* \rightarrow \{0,1\}^w$ maps arbitrary length bit strings onto strings of w bits. The function h is collision resistant. Thus, it is computationally infeasible for an adversary to find two inputs M, M' such that M≠M' and h(M)=h(M').

In an embodiment, a re-keying process is provided. In re-keying, given a message M and a MAC tag T computed under a given key K, a new MAC tag T' corresponding to a new key K' is determined as $T'=E_{K'}(E_K^{-1}(T))$. Since the tag T contains enough information to compute the value of h(M), there is no need to run the hash over the entire message during the re-key operation. Further, the new tag can be computed using small, constant amount of effort, independent of the length of the message M. Since the computational cost of re-keying is constant, rather than linear in the length of data that is authenticated, the present approach provides considerable performance advantages over prior approaches.

Still further, an adversary who surreptitiously alters the old tag value T still cannot trick the re-keying operation into creating a tag that corresponds to a message that the adversary has selected, as further described herein.

Figure 4:
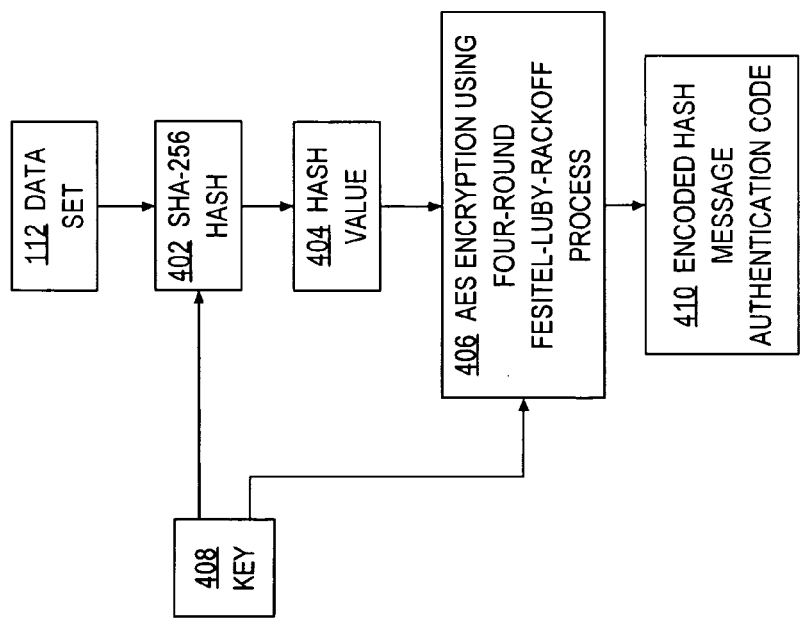
FIG. 4 illustrates generating an encoded hash message authentication code using particular logical operations for one embodiment.

A specific example of an EHM MAC process is now described with respect to FIG. 4, which illustrates generating an encoded hash message authentication code using particular logical operations for one embodiment.

3.2 Collision-Resistant Hash Function

In step 112 of FIG. 4, a data set is received. In an embodiment, an EHM MAC value is computed by hashing the data set with a collision-resistant hash function, then encoding the result using a keyed pseudo-random permutation (PRP).

In step 402, the SHA-256 hash operation is used to hash the data set 112, based on a shared key 408, resulting in creating a hash value 404. In various embodiments, the hash operation comprises SHA-1, SHA-256, MD5, or MD2. SHA-1, SHA-256, MD5, and MD2 are intended only as examples and not as limitations to this disclosure, and other hash operations may be used. SHA-1 produces a 160-bit output, providing $2^{160}$ permutations. SHA-256 produces a 256-bit output for $2^{256}$ collision-free permutations. In other embodiments, other hash operations can be used, and to ensure that the MAC provides security against an adversary who can perform $2^c$ computation, the hash operations are implemented using $w \geq 2c$. Thus, when w=256, h may be SHA-256.

3.3 Pseudo-Random Permutation

For the PRP or E, the Advanced Encryption Standard is not directly usable because it does not support 256-bit widths; its block size is 128 bits. However, a pseudo-random permutation with a 256-bit input can be implemented using other cryptographic elements. A suitable pseudo-random permutation can be constructed using AES in a four-round Luby-Rackoff function. The MAC key is used as the pseudo-random permutation key. As shown in step 406, AES encryption using a four-round Fesitel-Luby-Rackoff process is applied to the hash value 404 using shared key 408, resulting in generating an encoded hash MAC 410. Alternatively, the encryption operation is a 256-bit width Rijndael cipher. The XCB or EME block cipher modes of operation also may be used as alternatives.

3.4 Formal Specification of Example Embodiment

In an embodiment, an encrypted hash MAC is defined as follows, based on the SHA-256 hash function and AES. The EHM authentication tag computed on the message M with the key K is denoted as EHM(K,M). The inputs K and M have the definitions given in section 3.1 above, with the parameters w=128 and k=128, 196, or 256. In the following specification, the functions $MSB_n(X)$ and $LSB_n(X)$ return the leftmost n bits of X and the rightmost n bits of X, respectively. The values 0 and 1 denote a single zero or one bit, and $0^n$ denotes a string of n successive zero bits. The concatenation of two bit strings X and Y is written as X∥Y.

Based on the foregoing, in an embodiment, the MAC is defined as $$EHM(K,T)=E(K,SHA\text{-}256(M)),$$

where the function E(K,X) is defined as follows:

$$R_1 \leftarrow AES(K,0^{128})$$

$$R_2 \leftarrow AES(K,0^{127}\|1)$$

$$R_3 \leftarrow AES(K,0^{126}\|1\|0)$$

$$R_4 \leftarrow AES(K,0^{126}\|1\|1)$$

$$S_0 \leftarrow MSB_{128}(X)$$

$$S_1 \leftarrow LSB_{128}(X)$$

$$S_2 \leftarrow S_2 \oplus AES(R_1 \cdot S_1)$$

$$S_3 \leftarrow S_3 \oplus AES(R_2 \cdot S_2)$$

$$S_4 \leftarrow S_4 \oplus AES(R_3 \cdot S_3)$$

$$S_5 \leftarrow S_5 \oplus AES(R_4 \cdot S_4)$$

$$E(K,X) \leftarrow S_4 \| S_5$$

The variables A, B, C, and D are identical for each invocation of EHM with the same key, and can be cached between invocations.

The function E may be based upon Fesitel-Luby-Rackoff design with four rounds, using round keys that are generated from the block cipher key. The security of such a design is sufficient provided that the number of invocations of E, for a fixed key, is less than $2^{-w/2}=2^{-64}$.

3.5 Security Considerations

In an embodiment, E is a pseudo-random permutation such that an adversary's advantage at distinguishing the output of E from a truly random permutation is low. In an embodiment, the advantage A is defined by an experiment in which the adversary is presented with oracle access to a permutation, is allowed to query the oracle with inputs, and is challenged to distinguish whether the oracle is either E with a randomly chosen key K (and this event is denoted B) or is a random permutation (and this event is denoted $B^c$). The adversary is allowed q queries to the oracle, and then must indicate its guess as to the nature of the oracle. The event that it guesses that the oracle interfaces to E is denoted as D. The advantage is given by the difference between the true positive probability and the false positive probability:

$$A=P[D|B]-P[D|B^c]$$

In an embodiment, the security of a MAC is measured by the probability that an adversary can forge a message-tag pair. An adversary is allowed to choose a set of n messages that are authenticated under a random key K that is unknown to the adversary. Then another secret key K' is chosen at random, and the re-key operation is performed on each message in the set. The adversary controls each tag T that is entered into the re-key operation. Based on the foregoing, a "forgery" consists of the event that the attacker is able to produce a message-tag pair (M,T) such that MAC(K',M)=T, where M is not in the set of messages chosen by the adversary.

In an embodiment, the re-key operation is secure even if the adversary can manipulate both the stored messages and the stored tags. The computation of each tag is assumed to include information identifying each message. For example, if each message is a file, then the identifying information could comprise a full pathname of the file in a file system. The identifying information can be included in the tag computation by prepending it to the message prior to authentication.

In this context, the security of EHM during a re-key operation derives from whether an attacker, who can compute the tag for a new key, for any message, can distinguish E from a random permutation (and thus cannot break AES), or can find a collision in SHA-256. The likelihood that an attacker can do either is exceedingly low, or computationally infeasible, and therefore EHM is secure within the foregoing constraints.

4.0 Implementation Mechanisms—Hardware Overview

Figure 5:
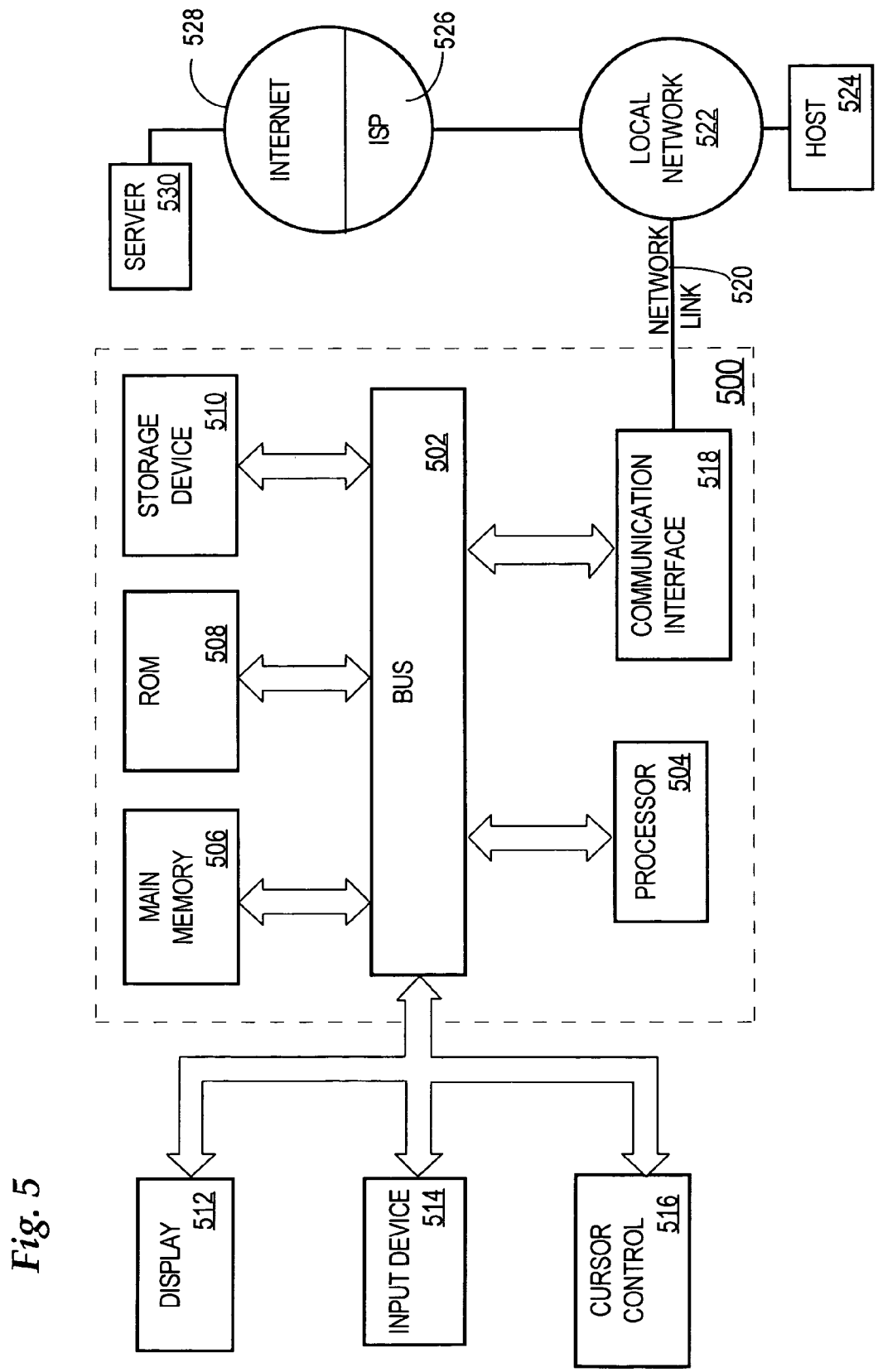
FIG. 5 illustrates a computer system on which an embodiment can be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for data storage using an encoded hash message authentication code. According to one embodiment of the invention, data storage using an encoded hash message authentication code is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for data storage using an encoded hash message authentication code as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A data processing apparatus, comprising:
   one or more processors;
   logic coupled to the one or more processors for execution and which, when executed by the one or more processors, causes:
   receiving a data set at the one or more processors;
   creating and storing a hash output value by applying the data set to a collision-resistant hash operation that provides the hash output value as output;
   encoding the hash output value, without encoding the data set, using a uniquely invertible keyed pseudo-random permutation operation based on a first shared key, to result in creating a first encoded authentication code associated with the data set;
   storing the first encoded authentication code in association with the data set;
   receiving a second key;
   re-encoding the hash output value based on the second key, to result in creating a second encoded authentication code, associated with the data set, without re-applying the data set to the hash operation;
   replacing the first encoded authentication code by storing the second encoded authentication code in association with the data set;
   wherein the first encoded authentication code is different than the second encoded authentication code;

wherein subsequent to creating the second authentication code, a third authentication code is generated from the data set and compared to the second authentication code to determine whether the data set was altered.

2. The apparatus of claim 1, wherein the logic comprises further sequences of instructions which, when executed by the one or more processors, cause the apparatus to perform:
prior to re-encoding the hash output value based on the second key, retrieving and decoding the first encoded authentication code to result in recovering the hash output value.

3. The apparatus of claim 1, wherein the hash operation is a one-way hash function having a fixed-length output.

4. The apparatus of claim 1, wherein the hash operation is SHA-1.

5. The apparatus of claim 1, wherein the permutation operation is AES in a four-round Luby-Rackoff function.

6. The apparatus of claim 1, wherein the encoding operation is a 256-bit Rijndael block cipher.

7. The apparatus of claim 1, wherein the data set is a message, and wherein the apparatus is any of a router and a switch in a packet-switched network.

8. The apparatus of claim 1, further comprising logic which, when executed by the one or more processors, causes storing the second encoded authentication code with the data set in a storage system.

9. The apparatus of claim 1, further comprising logic which, when executed by the one or more processors, causes forwarding the second encoded authentication code with the data set to a networking device or endpoint.

10. A data storage system, comprising:
one or more processors;
one or more electronic digital data storage devices coupled to the one or more processors directly or indirectly through one or more storage area networks;
logic coupled to the one or more processors for execution and which, when executed by the one or more processors, causes:
receiving a data set at the one or more processors;
creating and storing a hash output value by applying the data set to a collision-resistant hash operation that provides the hash output value as output;
encoding the hash output value, without encoding the data set, using a uniquely invertible keyed pseudo-random permutation operation based on a first shared key, to result in creating a first encoded authentication code associated with the data set;
storing the first encoded authentication code in association with the data set;
receiving a second key;
re-encoding the hash output value based on the second key, to result in creating a second encoded authentication code, associated with the data set, without re-applying the data set to the hash operation;
replacing the first encoded authentication code by storing the second encoded authentication code in association with the data set;
wherein the first encoded authentication code is different than the second encoded authentication code;
wherein subsequent to creating the second authentication code, a third authentication code is generated from the data set and compared to the second authentication code to determine whether the data set was altered.

11. The system of claim 10, wherein the logic comprises further sequences of instructions which, when executed by the one or more processors, cause the apparatus to perform:
prior to re-encoding the hash output value based on the second key, retrieving and decoding the encoded authentication code to result in recovering the hash output value.

12. The system of claim 10, wherein the hash operation is a one-way hash function having a fixed-length output.

13. The system of claim 10, wherein the hash operation is SHA-256.

14. The system of claim 10, wherein the permutation operation is AES in a four-round Luby-Rackoff function.

15. The system of claim 10, wherein the encoding operation is a 256-bit Rijndael block cipher.

16. A method, comprising:
receiving a data set;
creating and storing a hash output value by applying the data set to a collision-resistant hash operation that provides the hash output value as output;
encoding the hash output value, without encoding the data set, using a uniquely invertible keyed pseudo-random permutation operation based on a first shared key, to result in creating a first encoded authentication code associated with the data set;
storing the first encoded authentication code in association with the data set;
receiving a second key;
re-encoding the hash output value based on the second key, to result in creating a second encoded authentication code, associated with the data set, without re-applying the data set to the hash operation;
replacing the first encoded authentication code by storing the second encoded authentication code in association with the data set;
wherein the first encoded authentication code is different than the second encoded authentication code;
wherein subsequent to creating the second authentication code, a third authentication code is generated from the data set and compared to the second authentication code to determine whether the data set was altered;
wherein the method is performed by at least one device.

17. The method of claim 16, further comprising:
prior to re-encoding the hash output value based on the second key, retrieving and decoding the encoded authentication code to result in recovering the hash output value.

18. The method of claim 17, wherein the hash operation is a one-way hash function having a fixed-length output.

19. The method of claim 17, wherein the hash operation is SHA-1.

20. The method of claim 17, wherein the permutation operation is AES in a four-round Luby-Rackoff function.

21. The method of claim 17, wherein the encoding operation is a 256-bit Rijndael block cipher.

22. The method of claim 17, further comprising storing the second encoded authentication code with the data set in a storage system.

23. The method of claim 17, further comprising forwarding the second encoded authentication code with the data set to a networking device or endpoint.

24. A non-transitory computer-readable storage medium comprising instructions which, when executed by one or more processors, causes:
receiving a data set at the one or more processors;

creating and storing a hash output value by applying the data set to a collision-resistant hash operation that provides the hash output value as output;

encoding the hash output value, without encoding the data set, using a uniquely invertible keyed pseudo-random permutation operation based on a first shared key, to result in creating a first encoded authentication code associated with the data set;

storing the first encoded authentication code in association with the data set;

receiving a second key;

re-encoding the hash output value based on the second key, to result in creating a second encoded authentication code, associated with the data set, without re-applying the data set to the hash operation;

replacing the first encoded authentication code by storing the second encoded authentication code in association with the data set;

wherein the first encoded authentication code is different than the second encoded authentication code;

wherein subsequent to creating the second authentication code, a third authentication code is generated from the data set and compared to the second authentication code to determine whether the data set was altered.

25. The computer readable storage medium of claim 24, further comprising instructions which, when executed by the one or more processors, causes:

prior to re-encoding the hash output value based on the second key, retrieving and decoding the encoded authentication code to result in recovering the hash output value.

26. The computer readable storage medium of claim 25, further comprising instructions which, when executed by the one or more processors, causes storing the second encoded authentication code with the data set in a storage system.

27. The computer readable storage medium of claim 25, further comprising instructions which, when executed by the one or more processors, causes forwarding the second encoded authentication code with the data set to a networking device or endpoint.

28. The apparatus of claim 1, further comprising logic which when executed by the one or more processors causes comparing the second encoded authentication code to the third encoded authentication code to determine whether the data set was altered.

29. The system of claim 10, further comprising logic which when executed by the one or more processors causes comparing the second encoded authentication code to the third encoded authentication code to determine whether the data set was altered.

30. The method of claim 16, further comprising comparing the second encoded authentication code to the third encoded authentication code to determine whether the data set was altered.

31. The computer readable storage medium of claim 24, further comprising instructions which when executed by the one or more processors cause comparing the second encoded authentication code to the third encoded authentication code to determine whether the data set was altered.

* * * * *